No. 813,413. PATENTED FEB. 27, 1906.
J. McL. FORD.
EXPERIMENTAL TANK FOR TESTING SHIPS' MODELS.
APPLICATION FILED MAY 31, 1905.

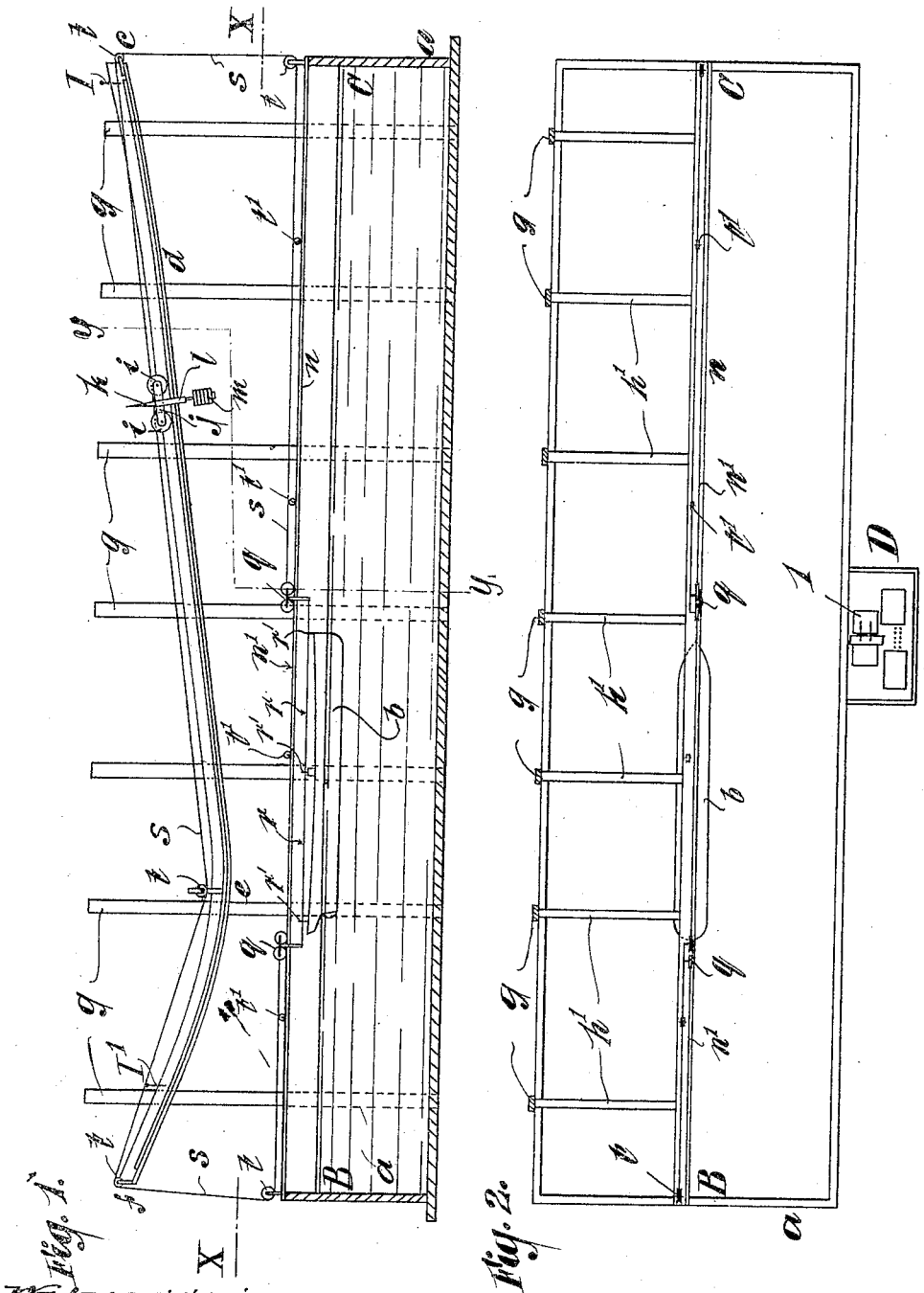

3 SHEETS—SHEET 2.

Witnesses:
C. H. Crawford
H. C. Crowley

Inventor:
John McLaren Ford
by B. Singer
Attorney

No. 813,413. PATENTED FEB. 27, 1906.
J. McL. FORD.
EXPERIMENTAL TANK FOR TESTING SHIPS' MODELS.
APPLICATION FILED MAY 31, 1905.

3 SHEETS—SHEET 3.

Witnesses:
C. H. Crawford
H. C. Crowley

Inventor:
John McLaren Ford
by B. Singer
Attorney

UNITED STATES PATENT OFFICE.

JOHN McLAREN FORD, OF BARROW-IN-FURNESS, ENGLAND.

EXPERIMENTAL TANK FOR TESTING SHIPS' MODELS.

No. 813,413.  Specification of Letters Patent.  Patented Feb. 27, 1906.

Application filed May 31, 1905. Serial No. 263,090.

*To all whom it may concern:*

Be it known that I, JOHN McLAREN FORD, of 70 Mount Pleasant, Barrow-in-Furness, Lancashire, England, have invented certain new and useful Improvements Connected with Experimental Tanks for Testing Ships' Models, of which the following is a specification.

This invention relates to experimental tanks in which ships' models are tested in order to obtain the resistance of the water, &c.

According to this invention the model ship is made to move by means of adjustable weights which run down an inclined plane capable of adjustment and then up another inclined plane which is used for automatically bringing the model to rest and for obtaining the amount of friction in the mechanism. The space moved through in a given time is automatically recorded by clockwork or other mechanism.

The invention is specially applicable for measuring the work done in moving any body through a fluid and for demonstrating experimentally the laws which govern fluid resistance—for example, the speed of a proposed ship derivable from a given horse-power or the effective horse-power required for a given speed and for comparing the resistance of various types or forms of ships' models.

In order that my said invention may be properly understood, I have hereunto appended three explanatory sheets of drawings, whereon—

Figure 5:
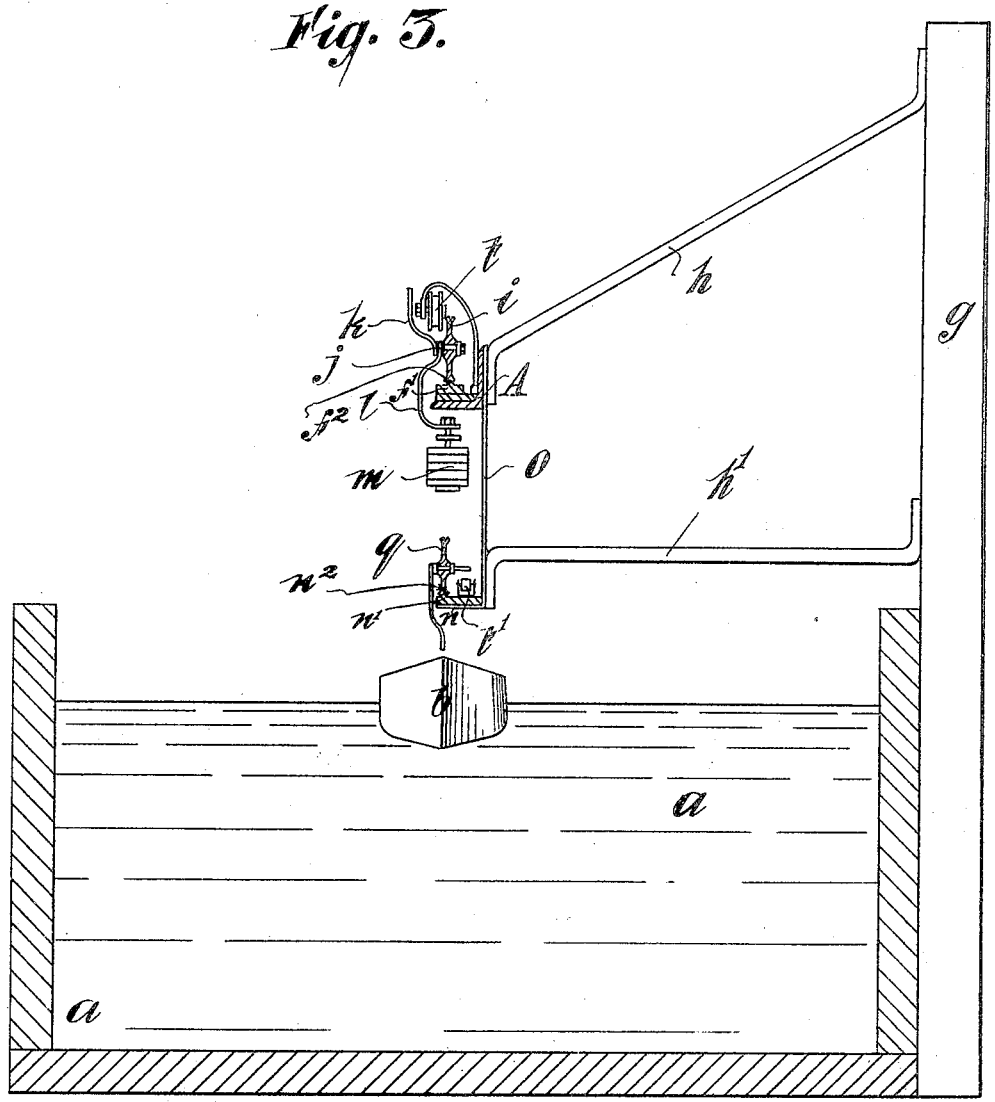
Figure 4:
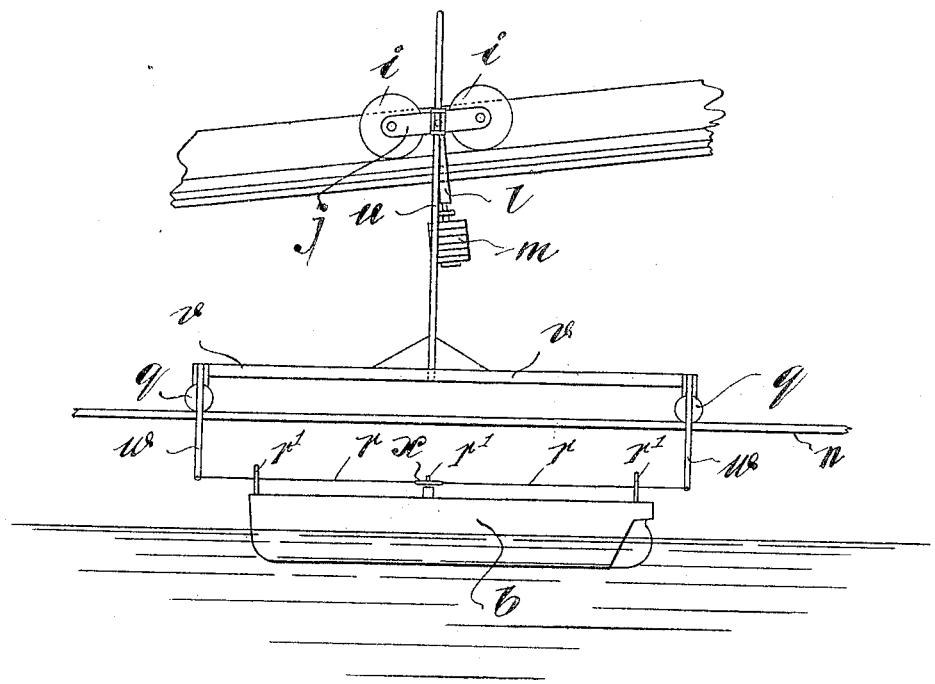

Figure 1 is a sectional view of one arrangement of the apparatus. Fig. 2 is a plan view of same. Fig. 3 is a cross-section, on an enlarged scale, taken on the line Y Y, Fig. 1. Fig. 4 shows a slightly-modified arrangement of the apparatus suitable for large tanks.

According to my invention, the apparatus comprises the usual tank $a$, in which the model $b$ is to be run, and the mechanism for obtaining the speed and resistance (or the work done in driving the model) consists of an inclined railway $c\ d\ e\ f$, preferably constructed of angle-iron A, (see Fig. 3,) to which is fitted in any suitable manner a rail $f'$, provided with a projecting ridge $f^2$, placed over the center of the tank $a$ and retained in position by means of arms $h$, suitably secured to vertical supports $g$, placed at the side of the tank. A trolley consisting of two grooved wheels or pulleys $i\ i$, fitted in a frame $j$, provided with an upwardly-projecting pointer $k$ and a downwardly-projecting arm $l$, runs on the rail $f'$. This trolley may be loaded by means of weights $m$ to suit the various forms or speeds of the model $b$. The railway $c\ d\ e\ f$ is preferably made with a long incline from $c$ to $e$ and a short incline from $f$ to $e$.

A horizontal railway $n$, having a rail $n'$ provided with a ridge $n^2$, is fitted some distance below the inclined railway $c\ d\ e\ f$, being secured in position by means of brackets $o$, which are supported in position by means of the arms $h$ and $h'$, secured to the vertical supports $g$. Two trolleys $q\ q$, similar in construction to the trolley on the inclined railway, but without weights, run on the horizontal railway $n$, and these trolleys are connected together below the railway $n$ by means of a cord $r$, to which is also secured, by means of slotted guide-pins $r'$ or in any other suitable manner, the model $b$. The two trolleys $q\ q$ are also attached to the loaded trolley on the inclined railway by means of the cord or its equivalent $s$, which passes over and under the guide-pulleys $t$, the whole being so arranged that all the parts move in unison. Friction-rollers $t'$ are also placed at intervals along the railway $n$.

In operating the apparatus the loaded trolley is hauled up the incline $e\ d\ c$, and consequently the model $b$ travels toward the point B. When the trolley is released, the action of gravity (provided the trolley $i$ has been sufficiently loaded) causes it to run down the incline $c\ d\ e$ and in so doing pull the model $b$ in the direction of the point C. The trolley when released continues to increase its velocity as it descends until the resistance of the model $b$, which has been increasing in magnitude owing to the increasing velocity equalizes the component part of the action of gravity, whereupon the model and trolley continue to travel at a uniform velocity until the bottom of the incline $c\ d\ e$ is reached. The trolley then travels up the incline $e\ f$, and the whole apparatus is brought to a standstill.

When large tanks are used, the apparatus may be slightly modified with advantage, as illustrated at Fig. 4. In this modification the cord or its equivalent $s$ may be dispensed with and the trolleys $q\ q$, running on the level railway, be rigidly connected to the trolley $i$ on the inclined railway by means of a rod $u$, which is slidably passed through a trunnion on the trolley $i$. This rod at its lower end is secured to the bar $v$, having depending arms $w$, between which the cord $r$ is stretched.

Any of the well-known electrical or other recorders for recording the distance traveled and the time taken may be used with this apparatus, and such recorder would preferably be inclosed in a suitable box or case D at the front of the tank.

The amount of "work done" in the apparatus in hauling the model through the water for a known distance (after uniformity of motion has been reached) is that due to the corresponding vertical height through which the mass of the loaded trolley has descended. The amount of work done in overcoming the resistance of the model for the known distance referred to in the preceding paragraph is the amount of work done in overcoming friction, which latter may be obtained thus: When ascertaining the amount of work done absorbed by friction, the model is released from the connections between the trolleys $q$ $q$ by simply slipping the slotted part or link $x$ of the cord $r$ over the center pin $r'$, so that the tension on the cord is in no way altered. The loaded trolley is then hauled up to any point until its pointer just touches a suspended needle—say at the point I—when it is released, preferably by burning a leash, and a needle at I' is so adjusted that the pointer of the trolley will just touch it when the trolley comes to a stop. The difference of the vertical distance of the center of gravity of the loaded trolley at the positions I and I' represents the amount of work done in overcoming the friction in the mechanism for a travel from I to I' along the inclined railway, and a proportionate part of it will represent the amount of work done for any other proportionate distance. Having found the model's resistance and speeds, then by the known laws of the corresponding relation between the performances of the model and those of full-sized ships the speeds and resistances of full-sized ships may be determined. The same method can also be applied for air-ships by connecting the model of the air-ship to the trolleys $q$ $q$ above the level railway.

Having now fully described my invention, what I claim, and desire to secure by Letters Patent, is—

1. An experimental tank for testing boat models, comprising a horizontal railway, a trolley therefor connected with the model, an inclined railway, and a weighted trolley therefor operatively connected with the model trolley.

2. An experimental tank comprising, in combination, a vessel, an inclined railway supported on the vessel, a weighted trolley running on the inclined railway and means for connecting the trolley to the model being experimented with.

3. An experimental tank comprising, in combination, a vessel, an inclined railway supported on the vessel, a horizontal railway, a weighted trolley adapted to run on the inclined railway, a trolley adapted to run on the horizontal railway and means for connecting the trolleys together and to the model being experimented with.

4. An experimental tank comprising, in combination, a vessel, an inclined railway which is curved up at one end, a horizontal railway arranged below the inclined railway, trolleys running on both railways, and means for connecting the trolleys together and to the model being experimented with.

5. An experimental tank comprising, in combination, a vessel, an inclined railway supported on uprights fitted to the vessel, a horizontal railway arranged below the inclined railway and also supported by said uprights, a weighted trolley adapted to run on the inclined railway, two trolleys adapted to run on the horizontal railway, guide-pulleys and means for connecting the trolleys together and to the model being experimented with.

6. An experimental tank comprising, in combination, a vessel, an inclined railway which is curved upward at one end supported on uprights fitted to the vessel, a horizontal railway arranged below the inclined railway, a trolley having a pointer and also means for attaching weights, two trolleys having depending arms and adapted to run on the horizontal railway, guide-pulleys, a cord connecting the three trolleys together and running over the guide-pulleys and a separate cord connecting the two trolleys of the horizontal railway together and being also removably connected to the model being experimented with.

In testimony whereof I affix my signature in presence of two witnesses.

JOHN McLAREN FORD.

Witnesses:
JAMES AIKEN,
WILLIAM FLEMING.